(12) United States Patent
Martin et al.

(10) Patent No.: US 12,139,423 B2
(45) Date of Patent: Nov. 12, 2024

(54) DIAGNOSTICS OF AN ON-BOARD WATER GENERATION SYSTEM

(71) Applicant: Ford Global Technologies, LLC, Dearborn, MI (US)

(72) Inventors: Douglas Raymond Martin, Canton, MI (US); Robert D. Bedard, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 340 days.

(21) Appl. No.: 17/683,849

(22) Filed: Mar. 1, 2022

(65) Prior Publication Data

US 2023/0278894 A1 Sep. 7, 2023

(51) Int. Cl.
| | |
|---|---|
| *C02F 1/32* | (2023.01) |
| *B01F 33/452* | (2022.01) |
| *B01F 35/221* | (2022.01) |
| *B60R 15/00* | (2006.01) |
| *C02F 1/00* | (2023.01) |
| *C02F 1/42* | (2023.01) |
| *G01J 1/42* | (2006.01) |

(Continued)

(52) U.S. Cl.
CPC ............ *C02F 1/325* (2013.01); *B01F 33/452* (2022.01); *B01F 35/22161* (2022.01); *B60R 15/00* (2013.01); *C02F 1/008* (2013.01); *G01J 1/429* (2013.01); *G07C 5/0816* (2013.01); *B01F 2101/305* (2022.01); *C02F 2201/005* (2013.01); *C02F 2201/008* (2013.01); *C02F 2303/04* (2013.01)

(58) Field of Classification Search
CPC .... C02F 1/325; C02F 1/008; C02F 2201/005; C02F 2201/008; C02F 2303/04
See application file for complete search history.

(56) References Cited

U.S. PATENT DOCUMENTS

| | | |
|---|---|---|
| 5,435,151 A | 7/1995 | Han |
| 6,684,648 B2 | 2/2004 | Faqih |

(Continued)

FOREIGN PATENT DOCUMENTS

| | | |
|---|---|---|
| CN | 102698495 A | 10/2012 |
| CN | 102701474 A | 10/2012 |

(Continued)

*Primary Examiner* — Nicole M Ippolito
(74) *Attorney, Agent, or Firm* — Vichit Chea; Price Heneveld LLP (57) ABSTRACT

A vehicle including: (a) a water generator configured to generate water; (b) a water storage container configured to store the water that the water generator generates; (c) an ultraviolet light emitter configured to emit ultraviolet light into the water storage container; (d) a sensor configured to detect the ultraviolet light that the ultraviolet light emitter has emitted; and (e) a human-machine interface configured to issue a notification to a user of the vehicle regarding the ultraviolet light emitter. The sensor can detect a wavelength range of the ultraviolet light that the ultraviolet light emitter has emitted. The sensor can detect an intensity of the ultraviolet light at a predetermined wavelength or wavelength range that the ultraviolet light emitter has emitted. The vehicle further comprises a controller in communication with the ultraviolet light emitter, the sensor, and the human-machine interface.

19 Claims, 6 Drawing Sheets

(51) Int. Cl.
  *G07C 5/08* (2006.01)
  *B01F 101/00* (2022.01)

(56) References Cited

U.S. PATENT DOCUMENTS

| | | |
|---|---|---|
| 8,252,174 B2 | 8/2012 | Jones et al. |
| 2005/0000911 A1* | 1/2005 | Thorpe .................. C02F 1/325 |
| | | 210/748.12 |
| 2016/0083936 A1 | 3/2016 | Martin et al. |

FOREIGN PATENT DOCUMENTS

| | | |
|---|---|---|
| CN | 205044604 U | 2/2016 |
| CN | 105595836 A | 5/2016 |
| CN | 105711468 A | 6/2016 |
| CN | 205523857 U | 8/2016 |
| CN | 109159643 A | 1/2019 |
| CN | 110588276 A | 12/2019 |
| CN | 211308340 U | 8/2020 |
| CN | 213178911 U | 5/2021 |
| WO | 2015186143 A2 | 12/2015 |

* cited by examiner

DIAGNOSTICS OF AN ON-BOARD WATER GENERATION SYSTEM

FIELD OF THE DISCLOSURE

The present disclosure generally relates to water generation within a vehicle.

BACKGROUND OF THE DISCLOSURE

Water generation within a vehicle for user consumption entails several possible issues. First, a passenger might not use a water generation system of a vehicle without assurance that sanitization functions of the water generation system, if any, are functioning properly. Second, a water agitation function of the water generation system unnecessarily expends energy to agitate water stored after generation, if the motion of the vehicle has already sufficiently agitated the water. Third, the water generation system would not generate water as efficiently as possible if the water generation system leaks water that the water generation system has generated.

SUMMARY OF THE DISCLOSURE

The present disclosure addresses the first issue by actively sensing that an ultraviolet light emitter, used as a device to sanitize the water that the water generation system generates, is emitting ultraviolet light and then notifying the passenger, such as via a human-machine interface, that the sanitization device (e.g., the ultraviolet light emitter) is working properly. The passenger then feels assured that the water is clean and will more readily drink the water.

The present disclosure addresses the second issue by sensing acceleration and deceleration of the vehicle, and deducing from such how much vibrational and lower frequency oscillatory agitation of the stored water has already occurred due to movement of the vehicle during use. The more agitation that the movement of the vehicle has imparted to the stored water, the less purposeful agitation with an agitator has to occur to maintain the sanitization of the stored water.

The present disclosure addresses the third issue by monitoring with a sensor a volume of water being stored that the water generation system generates. If the volume of the water decreases as a function of time without water being consumed, then a leak can be assumed. The vehicle can notify the user of the leak and the user can seek maintenance.

According to a first aspect of the present disclosure, a vehicle comprises: (a) a water generator configured to generate water; (b) a water storage container configured to store the water that the water generator generates; (c) an ultraviolet light emitter configured to emit ultraviolet light into the water storage container; (d) a sensor configured to detect the ultraviolet light that the ultraviolet light emitter has emitted; and (e) a human-machine interface configured to issue a notification to a user of the vehicle regarding the ultraviolet light emitter.

Embodiments of the first aspect of the present disclosure can include any one or a combination of the following features:

the sensor detects a wavelength range of the ultraviolet light that the ultraviolet light emitter has emitted;

the sensor detects an intensity of the ultraviolet light at a predetermined wavelength or wavelength range that the ultraviolet light emitter has emitted;

the vehicle further comprises a controller in communication with the ultraviolet light emitter, the sensor, and the human-machine interface;

the controller determines, based on output from the sensor, either (i) that the wavelength range of the ultraviolet light that the ultraviolet light emitter has emitted was partially within and partially outside of a predetermined wavelength range or (ii) that the intensity, at the predetermined wavelength or wavelength range, of the ultraviolet light that the ultraviolet light emitter has emitted is lower than a predetermined minimum intensity but is a positive value;

the controller maintains activation of the ultraviolet light emitter for longer than a predetermined period of time;

the notification that the human-machine interface issues indicates that the ultraviolet light emitter is performing adequately to sanitize the water in the water storage container;

the controller determines, based on output from the sensor, either (i) that the wavelength range of the ultraviolet light that the ultraviolet light emitter has emitted is entirely within a predetermined wavelength range or (ii) that the intensity, at the predetermined wavelength or wavelength range, of the ultraviolet light that the ultraviolet light emitter has emitted is higher than a predetermined minimum intensity;

the notification that the human-machine interface issues indicates that the ultraviolet light emitter is performing adequately to sanitize the water in the water storage container;

the controller determines, based on output from the sensor, either (i) that the wavelength range of the ultraviolet light that the ultraviolet light emitter has emitted is entirely outside of a predetermined wavelength range or (ii) that the intensity, at the predetermined wavelength or wavelength range, of the ultraviolet light that the ultraviolet light emitter has emitted is lower than a predetermined minimum intensity;

the notification that the human-machine interface issues indicates that the ultraviolet light emitter is performing inadequately to sanitize the water in the water storage container;

the vehicle further comprises a valve in communication with the water storage container, the valve comprising (i) an open position where water stored in the water storage container flows to an environment external to the vehicle and (ii) a closed position where water stored in the water storage container does not flow to the environment external to the vehicle;

the controller is in further communication with the valve;

the controller causes the valve to move to the open position;

the sensor is positioned so that the ultraviolet light transmits through water stored in the storage container before the sensor detects the ultraviolet light;

the controller causes the human-machine interface to present a selectable option regarding whether to purge the water from the water storage container; and the controller is configured to cause the valve to move to the open position when the selectable option is selected.

According to a second aspect of the present disclosure, a vehicle comprises (a) a water generator configured to generate water; (b) a water storage container configured to store the water that the water generator generates; and (c) a sensor configured to generate output indicative of a volume of water in the water storage container.

Embodiments of the second aspect of the present disclosure can include any one or a combination of the following features:

the vehicle further comprises a human-machine interface configured to issue a notification to a user of the vehicle regarding the volume of water in the water storage container;

the vehicle further comprises a controller in communication with the sensor and the human-machine interface;

the controller determines, from the output of the sensor, that the volume of water in the water storage container is decreasing as a function of time greater than a predetermined value;

the notification that the controller causes the human-machine interface to issue to the user is indicative of the water leaking from the water storage container;

the controller determines, from the output of the sensor, that the volume of water in the water storage container is not decreasing as a function of time greater than a predetermined value; and the notification that the controller causes the human-machine interface to issue to the user is indicative of the water not leaking from the water storage container.

According to a third aspect of the present disclosure, a vehicle comprises (a) a water generator configured to generate water; (b) a water storage container configured to store the water that the water generator generates; (c) an agitator assembly configured to agitate the water within the water storage container; (d) a sensor configured to generate output indicative of acceleration and deceleration of the vehicle; and (e) a controller in communication with the sensor and the agitator assembly, the controller configured to determine an agitation period of time (ta) to activate the agitator assembly to agitate the water stored in the water storage container as a function of a baseline period of time ($t_b$) and the output from the sensor, wherein the agitation period of time is the baseline period of time ($t_b$) minus an offset period of time ($t_o$) determined from the output of the sensor.

Embodiments of a third aspect of the present disclosure can include any one or a combination of the following features:

the controller is further configured to determine, from the output of the sensor, a total vibrational energy applied to the water stored in the water storage container;

the controller is further configured (i) to segment the output of the sensor as a function of time into periods of differing levels of vibration, (ii) to determine a total time that the vehicle spent at each of the differing levels of vibration, (iii) to assign a vibrational energy per unit of time for each of the differing levels of vibration, and (iv) to determine the total vibrational energy by multiplying the total time that the vehicle spent at each of the differing levels of vibration by the vibrational energy per unit of time for each of the differing levels of vibration and then summing the values;

the controller is further configured to determine, from output of the sensor, a number of oscillations of the water stored in the water storage container;

the offset period of time ($t_o$) is a function of one or more of: (i) a total vibrational energy applied to the water stored in the water storage container as the sensor determines from output from the sensor and (ii) a number of oscillations of the water stored in the water storage container as the controller determines from output from the sensor;

the offset period of time ($t_o$) is greater than the baseline period of time ($t_b$), and the agitation period of time (ta) that the controller determines to activate the agitator assembly is zero; and the baseline period of time ($t_b$) is a function of a temperature of an environment external to the vehicle.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
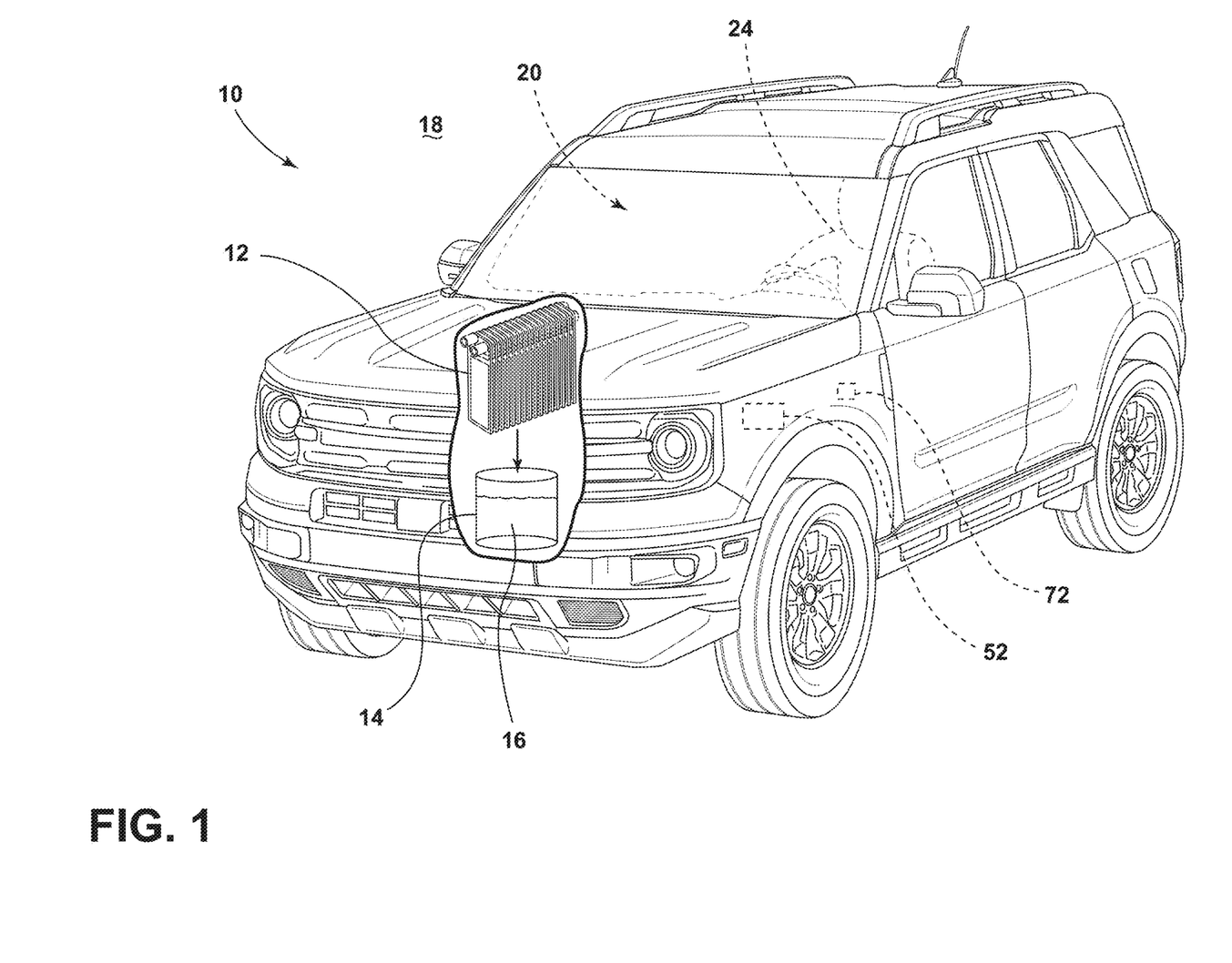
FIG. 1 is a perspective view of a vehicle of the present disclosure, illustrating the vehicle including a water generator that generates water that is stored in a water storage container for subsequent discharge out of an outlet, such as to a user located within an interior of the vehicle for user consumption of the water.
Figure 2:
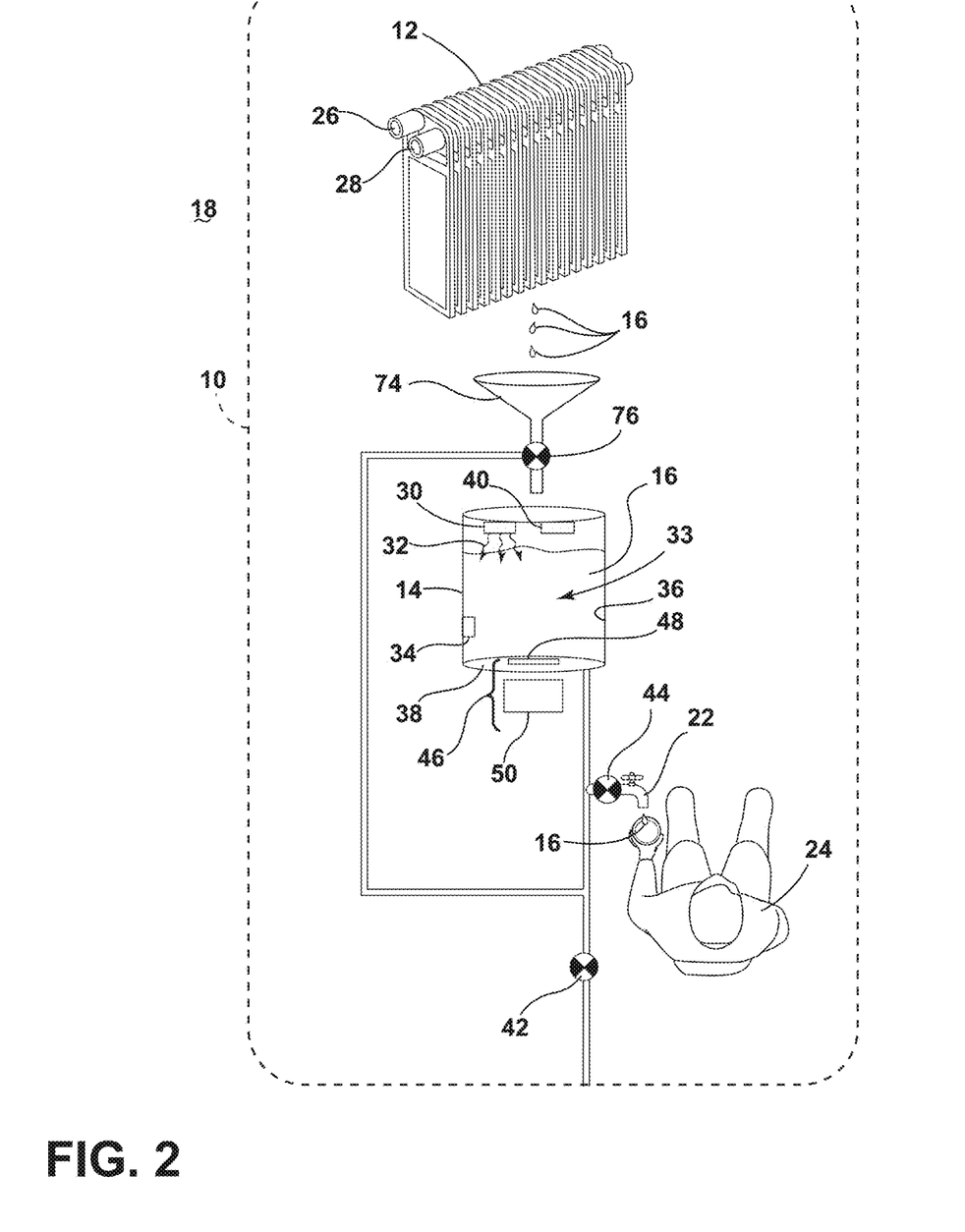
FIG. 2 is a schematic diagram of the vehicle of FIG. 1, illustrating that the vehicle further includes an ultraviolet light emitter positioned to emit ultraviolet light onto an inside surface of the water storage container and into the water in the water storage container to sanitize the water storage container and the water stored therein, as well as an agitator assembly to agitate the water disposed in the water storage container.

Referring now to FIGS. 1 and 2, a vehicle 10 includes a water generator 12 and a water storage container 14 that stores water 16 that the water generator 12 generates. The water generator 12 can be anything that generates the water 16 that can be stored in the water storage container 14. In embodiments, the water generator 12 condenses water vapor from air into liquid water 16 (hereinafter just "water" for convenience). The air can be from an environment 18 external to the vehicle 10 or air from an interior 20 of the vehicle 10. The water 16 can then be dispensed out an outlet 22 to a user 24 within the interior 20 of the vehicle 10, or to a user 24 located at the environment 18 exterior to the vehicle 10. The user 24 can then drink the water 16. The vehicle 10 can be a car, a truck, a sports utility vehicle, a van, an airplane, train passenger car, and any other thing that transports an occupant. The vehicle 10 can be propelled by an electric motor, an internal combustion engine, or both. The vehicle 10 can be manually operated, semi-autonomous, or fully autonomous.

In embodiments, the water generator 12 is an evaporator. The evaporator includes an inlet 26 and an outlet 28 for refrigerant (not illustrated). In embodiments, a compressor (not illustrated) pressurizes the refrigerant exiting the outlet 28 of the evaporator. A condenser (not illustrated) extracts heat from the refrigerant, which lowers the temperature of the refrigerant and condenses the refrigerant. The refrigerant is passed through a valve (not illustrated) where the refrigerant expands and the temperature decreases. The refrigerant is then supplied back to the evaporator through the inlet 26.

Air from the interior 20 or the environment 18 (or both) is passed over the evaporator. The evaporator, with the refrigerant, extracts heat from the air (thus reducing the temperature of the air) thus causing water vapor in the air to condense upon the evaporator as the water 16. The air, with its enthalpy and temperature reduced, is either directed to the interior 20 or expelled to the environment 18. The refrigerant in the evaporator increases in enthalpy and is passed out the outlet 28, as described above. The water 16 that condenses upon the evaporator is directed to the water storage container 14. The water 16 from the evaporator may pass through one or more additional storage containers, filters, piping, and valves before reaching the water storage container 14. The illustration at FIG. 2 is not intended to be a complete system diagram.

The vehicle 10 further includes an ultraviolet light emitter 30. The ultraviolet light emitter 30 is configured to emit ultraviolet light 32 into the water storage container 14. For example, in embodiments, the ultraviolet light emitter 30 is disposed within an interior 33 of the water storage container 14. The ultraviolet light emitter 30, when activated, emits the ultraviolet light 32 onto and into the water 16, as well as onto an inside surface 36 of the water storage container 14. "Ultraviolet light" herein means electromagnetic radiation having a wavelength within a range of from 10 nm to 400 nm. In embodiments, the wavelength of the ultraviolet light 32 is 10 nm, 50 nm, 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 310 nm, 320 nm, 330 nm 340 nm, 350 nm, 360 nm, 370 nm, 380 nm, 390 nm, or 400 nm, or within any range bound by any two of those values (e.g., from 100 nm to 300 nm, from 220 nm to 300 nm, and so on). In embodiments, the ultraviolet light emitter 30 is one or more light emitting diodes. In other embodiments, the ultraviolet light emitter 30 is one or more mercury vapor lamps. The ultraviolet light 32 sanitizes the water 16 by destroying microbes within the water 16 or hindering the ability of the microbes to reproduce or replicate. The ultraviolet light 32 additionally sanitizes the inside surface 36 of the water storage container 14, which helps prevent water 16 introduced into the water storage container 14 from becoming contaminated with microbes. Microbes include bacteria, viruses, fungi, and the like.

The vehicle 10 further includes a sensor 34 that is configured to detect the ultraviolet light 32 that the ultraviolet light emitter 30 has emitted. For example, in embodiments, the sensor 34 is at least partially disposed within the interior 33 of the water storage container 14 and in the path of the ultraviolet light 32 that the ultraviolet light emitter 30 emits. In embodiments, the sensor 34 detects a wavelength range of the ultraviolet light 32 that the ultraviolet light emitter 30 has emitted. In embodiments, the sensor 34 detects an intensity of the ultraviolet light 32 at a predetermined wavelength or wavelength range that the ultraviolet light emitter 30 has emitted. In such embodiments, the sensor 34 can produce an output voltage that varies as a function of the intensity of the ultraviolet light 32 that the ultraviolet light emitter 30 has emitted. In embodiments, there is more than one sensor 34, and both the wavelength range and the intensity of the ultraviolet light 32 at the predetermined wavelength or wavelength range that the ultraviolet light emitter 30 has emitted are detected.

In embodiments, the sensor 34 is positioned so that the ultraviolet light 32 that the ultraviolet light emitter 30 emits transmits through at least a portion of the water 16 stored in the water storage container 14 before the sensor 34 detects the ultraviolet light 32. For example, the sensor 34 can be disposed on the inside surface 36 of the water storage container 14 below, at, or near a bottom 38 of the water storage container 14. Positioning the sensor 34 so that the ultraviolet light 32 transmits through the water 16 before the sensor 34 detects the ultraviolet light 32 helps ensure that the intensity of the ultraviolet light 32 (at the desired wavelength, wavelength range, or both) is sufficient to sanitize the water 16 within the water storage container 14. The sensor 34 will generate an output that is indicative of increasing intensity as the sensor 34 is positioned closer to the ultraviolet light emitter 30. Thus, placing the sensor 34 too close to the ultraviolet light emitter 30 will cause the sensor 34 to generate output indicative of high intensity but the intensity of the ultraviolet light 32 actually reaching the water 16 may be insufficient to sanitize the water 16.

In embodiments, the vehicle 10 further includes a sensor 40. The sensor 40 is configured to generate output indicative of the volume of water 16 in the water storage container 14. For example, the sensor 40 can rely upon time of flight principles, from which the level (and thus the volume) of the water 16 in the water storage container 14 can be determined. As another example, the sensor 40 can generate output indicative of a pressure that the water 16 in the water storage container 14 imparts upon the sensor 40, and the volume of the water 16 can be determined from the output as well, because decreasing the volume of the water 16 decreases the pressure that the water 16 imparts upon the sensor 40.

In embodiments, the vehicle 10 further includes a valve 42. The valve 42 is in communication with the water storage container 14. The valve 42 has an open position and a closed position. When the valve 42 is in an open position, the water 16 in the water storage container 14 flows from the water storage container 14 to the environment 18 external to the vehicle 10. In other words, when the valve 42 is in the open position, the water 16 in the water storage container 14 is purged from the vehicle 10. When the valve 42 is in the closed position, the water 16 in the water storage container 14 does not flow from the water storage container 14 to the environment 18 external to the vehicle 10.

In embodiments, the vehicle 10 further includes a valve 44 that is communication with the outlet 22. The valve 44 has an open position and a closed position. When the valve 44 is in the open position, water 16 can be discharged out of the outlet 22 to the user 24 from the water storage container 14. When the valve 44 is in the closed position, water 16 cannot be discharged out of the outlet 22 to the user 24.

In embodiments, the vehicle 10 further includes an agitator assembly 46 that is configured to agitate the water 16 within the water storage container 14. For example, in embodiments, the agitator assembly 46 includes a stirrer 48 within the water storage container 14, such as an iron-containing rod, and a base 50 disposed below the water storage container 14 that generates a rotating magnetic field that in turn causes the stirrer 48 to rotate. Rotation of the stirrer 48 agitates the water 16 within the water storage container 14.

In embodiments, the vehicle 10 further includes a sensor 52 (see, e.g., FIG. 1) that is configured to generate output indicative of acceleration and deceleration of the vehicle 10. For example, in embodiments, the sensor 52 is an accelerometer. The acceleration and deceleration that the sensor 52 senses can be in any direction (e.g., up, down, left, right, forward, reverse, and so on).

Figure 3:
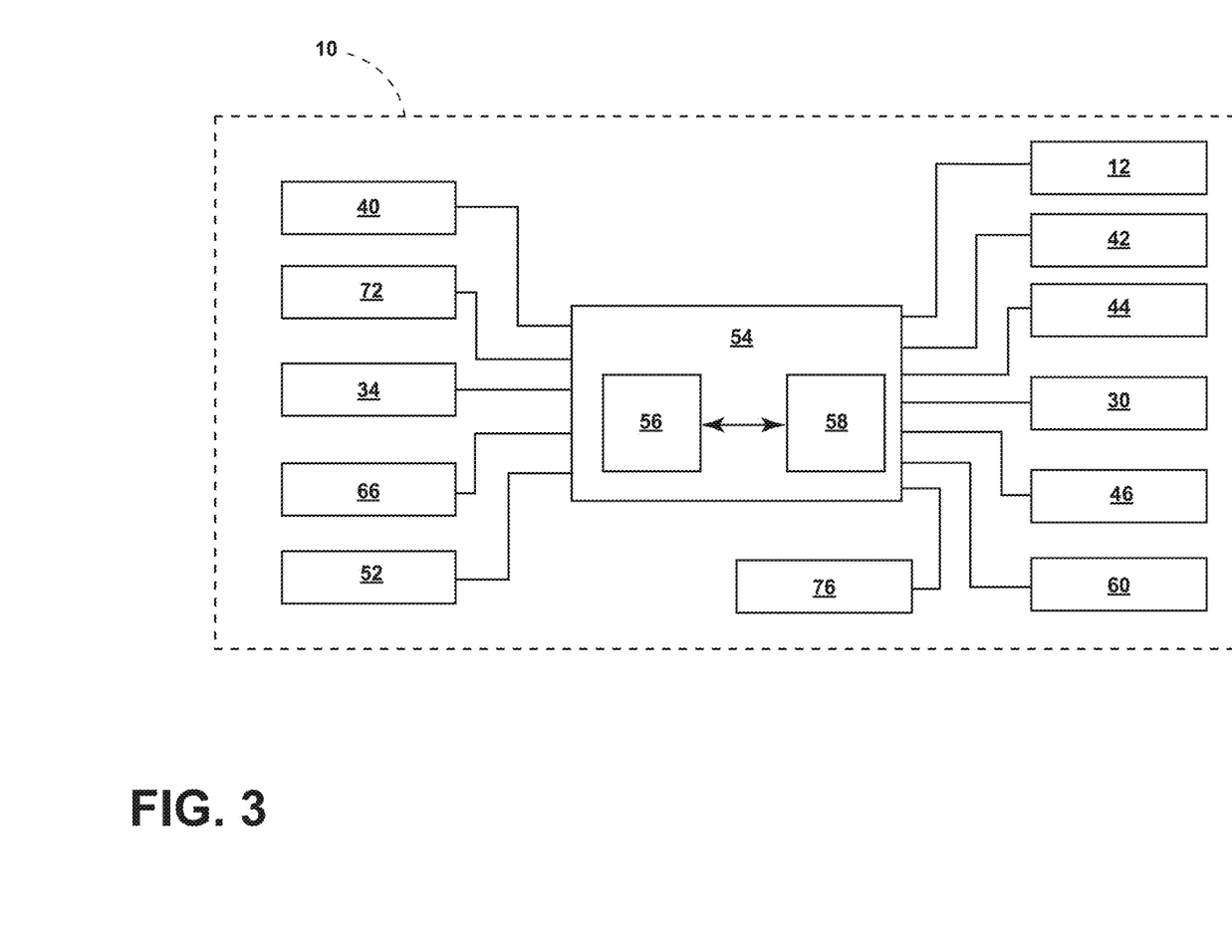
FIG. 3 is a schematic diagram of the vehicle of FIG. 1, illustrating that the vehicle further includes a controller in communication with various sensors from which the controller can determine the volume of water in the water storage container, the wavelengths and intensity of the ultraviolet light that the ultraviolet light emitter emits, and the movement (e.g., acceleration and deceleration) of the vehicle, among other things.

Referring now additionally to FIG. 3, the vehicle 10 further includes a controller 54. The controller 54 is in communication with the ultraviolet light emitter 30, the sensor 34, the sensor 40, the sensor 52, the valve 42, the valve 44, and the agitator assembly 46 (e.g., the base). More particularly, the sensors 34, 40, 52 generate output that the controller 54 receives, and the controller 54 controls activation and deactivation of the ultraviolet light emitter 30, and movement of the valves 42, 44 between their respective open positions and the closed positions. The controller 54 may include a processor 56 and memory 58. The memory 58 stores programs that the processor 56 executes to effectuate the actions of the controller 54. The processor 56 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 58 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid-state drives, etc.). In some examples, the memory 58 includes multiple kinds of memory, particularly volatile memory and non-volatile memory.

In embodiments, the controller 54 is configured to activate the ultraviolet light emitter 30 for a predetermined period of time. As mentioned above, the ultraviolet light emitter 30 emits the ultraviolet light 32 to sanitize the water 16 stored in the water storage container 14. The emitted ultraviolet light 32 additionally sanitizes the inside surface 36 of the water storage container 14. In embodiments, the predetermined period of time is at least sufficient to sanitize the water 16 and the inside surface 36. The predetermined period of time may be, for example, 5 minutes, 10 minutes, or longer.

While the ultraviolet light emitter 30 emits the ultraviolet light 32, the sensor 34 is generating output that the controller 54 receives. As discussed, the output of the sensor 34 is indicative of the wavelength range and/or the intensity of the ultraviolet light 32, at the predetermined wavelength or wavelength range, that the ultraviolet light emitter 30 emits.

Figure 4:
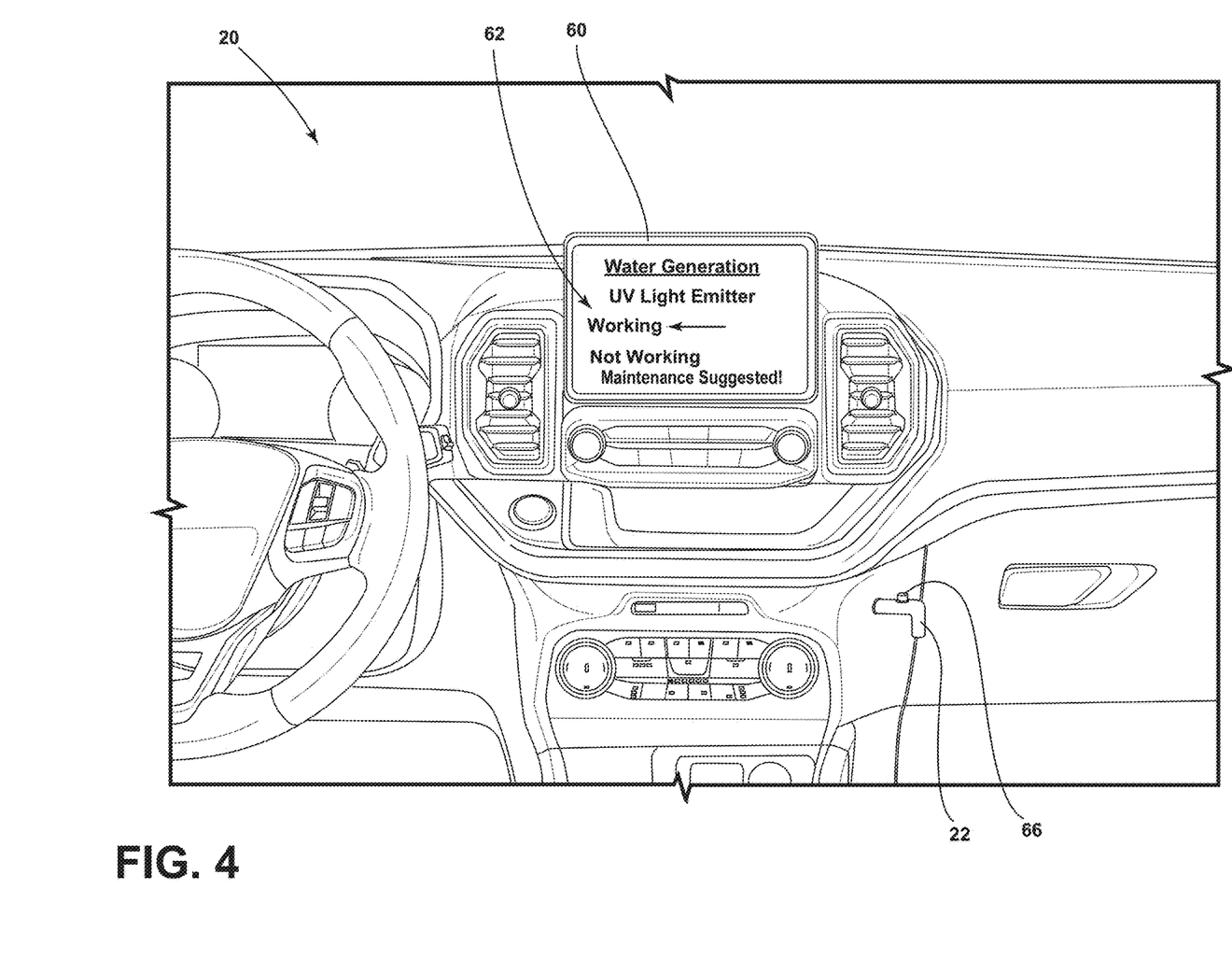
FIG. 4 is a perspective view of an interior of the vehicle of FIG. 1, illustrating an outlet in liquid communication with the water storage chamber that can discharge water to the user and a human-machine interface in communication with the controller of FIG. 3, the human-machine interface displaying a notification to the user regarding the operational status of the ultraviolet light emitter.

Referring now additionally to FIG. 4, the vehicle 10 further includes a human-machine interface 60 in communication with the controller 54. The human-machine interface 60 is configured to issue a notification 62 to the user 24 of the vehicle 10 regarding the ultraviolet light emitter 30. In embodiments, the human-machine interface 60 is a display with touch-screen interactive capability.

In embodiments, the controller 54 determines, based on the output of the sensor 34, that the wavelength range of the ultraviolet light 32 that the ultraviolet light emitter 30 has emitted is entirely within a predetermined wavelength range. For example, the predetermined wavelength range can be any range defined by any two of the following values: 10 nm, 50 nm, 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 310 nm, 320 nm, 330 nm 340 nm, 350 nm, 360 nm, 370 nm, 380 nm, 390 nm, or 400 nm, or within any range bound by any two of those values (e.g., from 100 nm to 300 nm, from 220 nm to 300 nm, from 200 nm to 280 nm, from 250 nm to 260 nm, and so on). In embodiments, as a consequence of such a determination, the notification 62 that the controller 54 causes the human-machine interface 60 to issue indicates that the ultraviolet light emitter 30 is performing adequately to sanitize the water 16 in the water storage container 14. For example, the notification 62 might read "Working." With the notification 62, the user 24 feels comfortable drinking the water 16.

In embodiments, the controller 54 determines, based on output from the sensor 34, that the intensity, at the predetermined wavelength (e.g., 260 nm) or wavelength range (e.g., 200 nm to 290 nm), of the ultraviolet light 32 that the ultraviolet light emitter 30 has emitted is higher than a predetermined intensity. The predetermined intensity can be any intensity, such as an intensity determined to be sufficient to sanitize the volume of water 16 within the water storage container 14. In embodiments, as a consequence of such a determination, the notification 62 that the controller 54 causes the human-machine interface 60 to issue indicates that the ultraviolet light emitter 30 is performing adequately to sanitize the water 16 in the water storage container 14. For example, the notification 62 might read "Working."

In embodiments, the controller 54 determines, based on output from the sensor 34, that the wavelength range of the ultraviolet light 32 that the ultraviolet light emitter 30 has emitted is entirely outside of the predetermined wavelength range. For example, the predetermined wavelength range might be from 250 nm to 290 nm, and the controller 54 determines, based on output from the sensor 34, that the ultraviolet light 32 that the ultraviolet light emitter 30 has emitted is entirely outside of that predetermined wavelength range of from 210 nm to 230 nm. In embodiments, as a consequence of such a determination, the notification 62 that the controller 54 causes the human-machine interface 60 to issue indicates that the ultraviolet light emitter 30 is performing inadequately to sanitize the water 16 in the water storage container 14. For example, the notification 62 might read "Not Working." In embodiments, as a consequence of such a determination, the controller 54 causes the valve 42 to move to the open position, and the water 16 in the water storage container 14 is purged to the environment 18 external to the vehicle 10.

In embodiments, the controller 54 determines, based on output from the sensor 34, that the intensity, at the predetermined wavelength or wavelength range, of the ultraviolet light 32 that the ultraviolet light emitter 30 has emitted is lower than the predetermined minimum intensity. For example, the predetermined minimum intensity at the predetermined wavelength might be 100 µW/cm², and the controller 54 determines, based on output from the sensor 34, that the intensity at the predetermined wavelength is only 50 µW/cm². In embodiments, as a consequence of such a determination, the notification 62 that the controller 54 causes the human-machine interface 60 to issue indicates that the ultraviolet light emitter 30 is performing inadequately to sanitize the water 16 in the water storage container 14. For example, the notification 62 might read "Not Working." In embodiments, as a consequence of such a determination, the controller 54 causes the valve 42 to move to the open position, and the water 16 in the water storage container 14 is purged to the environment 18 external to the vehicle 10. In embodiments, the controller 54, via the human-machine interface 60, provides the user 24 with a selectable option to dispense water 16 out of the outlet 22 although the notification 62 indicates that the ultraviolet light emitter 30 is performing inadequately to sanitize the water 16 in the water storage container 14. In embodiments, the controller 54 causes the valve 44 to move to the closed position to prevent discharge of water 16 from the outlet 22 to the user 24, until the controller 54 determines, based on output from the sensor 34, that the intensity, at the predetermined wavelength or wavelength range, of the ultraviolet light 32 that the ultraviolet light emitter 30 has emitted is no longer lower than the predetermined minimum intensity (e.g., after servicing or replacement of the ultraviolet light 32).

In embodiments where the controller 54 causes the valve 42 to move to the open position to purge the water 16 from the water storage container 14, the controller 54 can prevent water 16 from entering the water storage container 14 until some action is performed. In embodiments, the vehicle 10 further includes a collector 74 (see FIG. 2) that collects the water 16 that the water generator 12 generates, before the water 16 enters the water storage container 14, and a valve 76 in communication with the controller 54. The controller 54 can prevent the water 16 from entering the water storage container 14 from the collector 74, until some action is performed, by manipulating valve 76 to direct the water 16 from the collector 74 to the valve 42 to purge the water 16 from the vehicle 10 The controller 74 can otherwise manipulate the valve 76 to cause the water 16 collected in the collector 74 to flow into the water storage container 14. In embodiments, the action required to be performed can be the replacement of the ultraviolet light emitter 30. As an alternative to preventing water 16 from entering the water storage container 14, the controller 54 can maintain the valve 42 in the open position until that required action is performed. In addition, the controller 54 can cause the valve 44 in communication with the outlet 22 to move to the closed position and prevent the discharge of water 16 to the user 24, until the action is performed.

In embodiments, the controller 54 determines, based on output from the sensor 34, that the wavelength range of the ultraviolet light 32 that the ultraviolet light emitter 30 has emitted was partially within and partially outside of a predetermined wavelength range. For example, the predetermined wavelength range can be from 270 nm to 290 nm, and the controller 54 determines that the ultraviolet light 32 emitted was throughout the range of from 250 nm to 280 nm. As a consequence, in embodiments, the controller 54 maintains activation of the ultraviolet light emitter 30 for longer than a predetermined period of time, such as a predetermined period of time that the controller 54 would have maintained activation of the ultraviolet light emitter 30 if the controller 54 determined that the wavelength range of the ultraviolet light 32 that the ultraviolet light emitter 30 has emitted was entirely within the predetermined wavelength range. In other words, in those embodiments, the controller 54 compensates for some of the emitted ultraviolet light 32 being outside of the predetermined wavelength range by extending the period of time that the ultraviolet light emitter 30 emits the ultraviolet light 32. For example, the predetermined period of time might be 5 minutes if the emitted ultraviolet light 32 was entirely within the predetermined wavelength range, and the controller 54, after determining that the emitted ultraviolet light 32 was partially within and partially outside of the predetermined wavelength range, maintains activation of the ultraviolet light emitter 30 for 10 minutes. In such instances, the ultraviolet light 32 that the ultraviolet light emitter 30 has emitted might fall partially outside of a predetermined wavelength range, but the intensity of the ultraviolet light 32 emitted at the predetermined wavelength or predetermined wavelength range is nevertheless considered sufficient to sanitize the water 16 in the water storage container 14. In addition, in embodiments, the notification 62 that the controller 54 causes the human-machine interface 60 to issue indicates that the ultraviolet light emitter 30 is performing adequately to sanitize the water 16 in the water storage container 14 (e.g., "Working") and optionally that maintenance of the ultraviolet light emitter 30 is suggested.

In embodiments, the controller 54 determines, based on output from the sensor 34, that the intensity, at the predetermined wavelength or wavelength range, of the ultraviolet light 32 that the ultraviolet light emitter 30 has emitted is lower than the predetermined minimum intensity but is a positive value. For example, the predetermined minimum intensity at the predetermined wavelength might be 100 µW/cm², and the controller 54 determines, based on output from the sensor 34, that the intensity at the predetermined wavelength is 50 µW/cm². As a consequence, in embodiments, the controller 54 maintains activation of the ultraviolet light emitter 30 for longer than a predetermined period of time, such as a predetermined period of time that the controller 54 would have maintained activation of the ultraviolet light emitter 30 if the controller 54 determined that the wavelength range of the ultraviolet light 32 that the ultraviolet light emitter 30 has emitted was entirely within the predetermined wavelength range. In other words, as explained above, in those embodiments, the controller 54 compensates for the intensity being less than the predetermined minimum intensity by extending the period of time that the ultraviolet light emitter 30 emits the ultraviolet light 32. In addition, in embodiments, the notification 62 that the controller 54 causes the human-machine interface 60 to issue indicates that the ultraviolet light emitter 30 is performing adequately to sanitize the water 16 in the water storage container 14 (e.g., "Working) and optionally that maintenance of the ultraviolet light emitter 30 is suggested.

Figure 5:
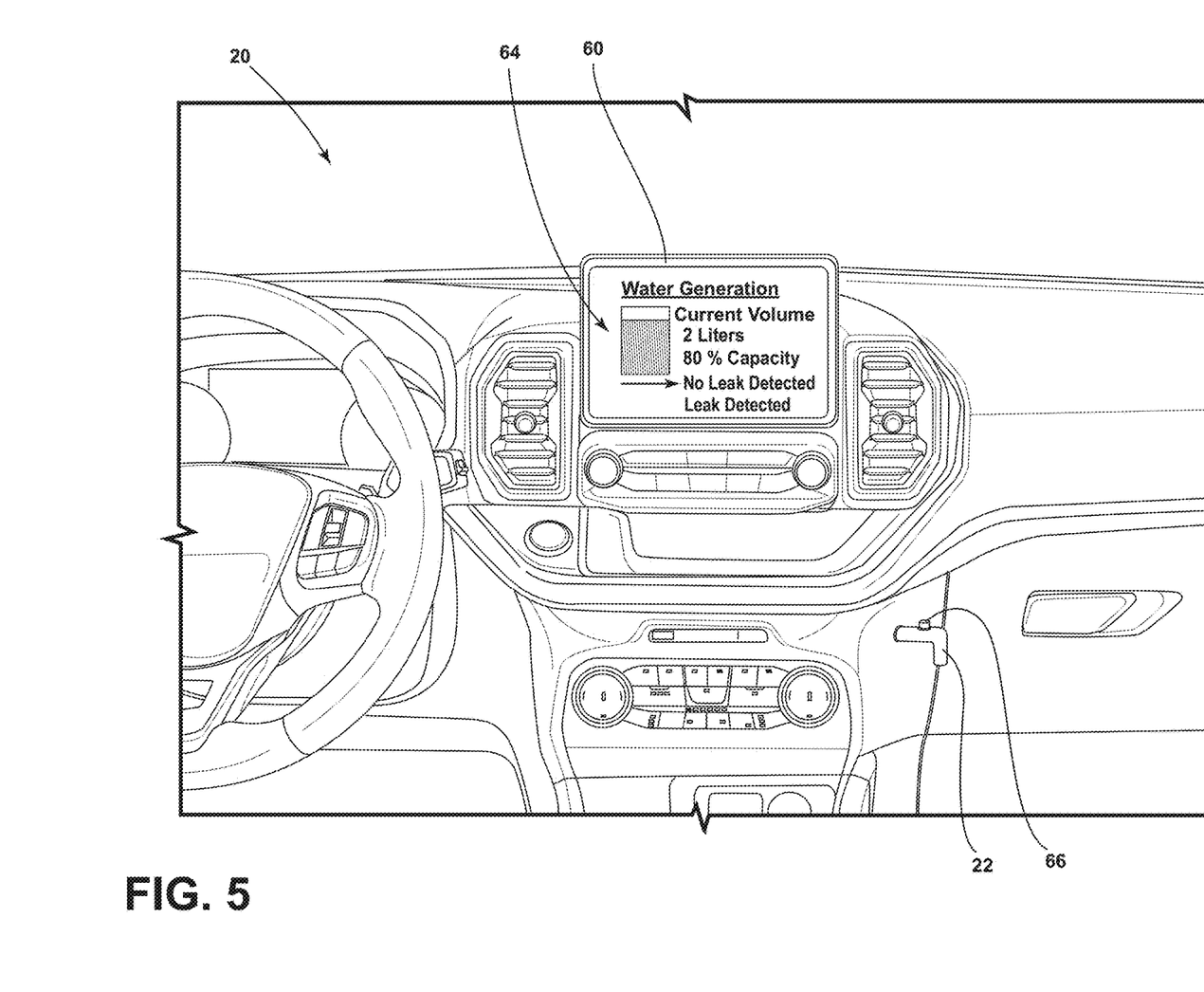
FIG. 5 is a perspective view of the interior of the vehicle of FIG. 1, illustrating the human-machine interface displaying a notification to the user regarding a volume of water stored in the water storage container and regarding whether the controller has detected a leak of the water from the water storage container.

Referring now to FIG. 5, in embodiments, the human-machine interface 60 is further configured to issue a notification 64 to the user 24 of the vehicle 10 regarding the volume of the water 16 in the water storage container 14. The controller 54, as mentioned, receives the output that the sensor 40 generates and determines the volume of water 16 within the water storage container 14 from the output. The controller 54 then causes the human-machine interface 60 to issue the notification 64. The notification 64 can indicate the volume in absolute terms (e.g., 2 liters), the percentage of the full capacity of the water storage container 14 that the volume of the water 16 occupies (e.g., 80 percent), or both.

In embodiments, the controller 54 determines whether the water 16 is leaking from the water storage container 14. For example, in embodiments, the controller 54 determines, from output of the sensor 40, that the volume of water 16 in the water storage container 14 is decreasing as a function of time. In embodiments, the controller 54 further determines whether such a decrease of the volume of water 16 in the water storage container 14 exceeds a predetermined value. For example, the predetermined value can be a value that assumes some evaporation or minimal leakage of water 16 from the water storage container 14. If the determined decrease as a function of time exceeds the predetermined value, then the controller 54 can determine that a leakage sufficient to require maintenance is occurring or has occurred. In such circumstances, the notification 64 that the controller 54 causes the human-machine interface 60 to issue to the user 24 is indicative of the water 16 leaking from the water storage container 14 (e.g., "Leak Detected").

In embodiments, the controller 54 determines, from the output of the sensor 40, that the volume of water 16 in the water storage container 14 is not decreasing as a function of time greater than the predetermined value. The controller 54 so determining is indicative of the water 16 not leaking from the water storage container 14, at least to an undesirable degree. In such circumstances, the notification 64 that the controller 54 causes the human-machine interface 60 to issue to the user 24 is indicative of the water 16 not leaking from the water storage container 14 (e.g., "No Leak Detected").

Further, in embodiments, the controller 54 does not determine the decrease of the volume of water 16 as a function of time when the user 24 is causing the water 16 to discharge out the outlet 22, because such decrease is intentional and not indicative of leakage. For example, the user 24 can have the capability to cause the valve 42 to move from the closed position to the open position to cause water 16 to discharge out of the outlet 22, such as via pressing a button 66 and the button 66 can be in communication with the controller 54. In embodiments, the controller 54 is configured to ignore the decrease in volume of water 16 from the water storage container 14 while the button 66 is depressed and causing water 16 to discharge out of the outlet 22.

In embodiments, the controller 54 determines an agitation period of time (ta) to activate the agitator assembly 46 to agitate the water 16 stored in the water storage container 14. Agitation of the water 16 improves the efficacy of efforts to sanitize the water 16, such as with the ultraviolet light emitter 30, because agitation causes molecules of water 16 to change position within the water storage container 14 and become closer to the ultraviolet light emitter 30. In embodiments, the agitation period of time (ta) is a function of a baseline period of time ($t_b$) and output of the sensor 52 (see, e.g., FIG. 1). The baseline period of time ($t_b$) is the amount of time predetermined to agitate sufficiently the water 16 in the water storage container 14 (e.g., 30 seconds). Based on the output of the sensor 52, the controller 54 determines an offset period of time ($t_o$). The offset period of time ($t_o$) is subtracted from the baseline period of time ($t_b$) to determine the agitation period of time (ta) (i.e., if $t_b > t_o$, then $t_a = t_b - t_o$). In the event that the offset period of time ($t_o$) is greater than or equal to the baseline period of time ($t_b$), then the agitation period of time ($t_a$) is determined to be zero (i.e., if $t_o \geq t_b$, then $t_a = 0$).

As the vehicle 10 moves between locations during operation, the vehicle 10 vibrates and accelerates/decelerates in many different directions. As a consequence, the water 16 within the water storage container 14 is agitated. The agitation of the water 16 from movement of the vehicle 10 can be considered when determining how long the water 16 should be agitated via activation of the agitator assembly 46, i.e., the agitation period of time ($t_a$). For example, if movement of the vehicle 10 is causing sufficient agitation of the water 16 in the water storage container 14, then agitation of the water 16 via the agitation assembly would be redundant and a less than optimal use of energy. As another example, if movement of the vehicle 10 agitated the water 16 but insufficiently, then agitation of the water 16 via the agitation assembly remains useful but for a period of time less than the baseline period of time ($t_b$).

In embodiments, the controller 54 is configured to determine, from the output of the sensor 52, a total vibrational energy applied to the water 16 in the water storage container 14. For example, in embodiments, the controller 54 is configured to segment the output from the sensor 52 generated during movement of the vehicle 10 as a function of time into periods of differing levels of vibration (e.g., low, medium, and high levels of vibration). The controller 54 then determines the total time that the vehicle 10 spent at each of the differing levels of vibration (e.g., A minutes at the low level of vibration, B minutes at the medium level of vibration, and C minutes at the high level of vibration). The controller 54 assigns a vibrational energy per unit of time for each of the differing levels of vibration (e.g., X energy/minute for the low level of vibration, Y energy/minute for the medium level of vibration, and Z energy/minute for the high level of vibration). The controller 54 then determines the total vibrational energy by multiplying the total time that the vehicle 10 spent at each of the differing levels of vibration by the vibrational energy per unit of time for each of the differing levels of vibration and then summing the values (e.g., total vibrational energy=A*X+B*Y+C*Z).

In embodiments, the controller 54 is configured to determine, from the output of the sensor 52, a number of oscillations of the water 16 stored in the water storage container 14. As the water 16 oscillates, molecules of water 16 change position and thus oscillation is considered to be agitation of the water 16 for purposes of this disclosure. An oscillation of the water 16 differs from vibration of the water 16 in that the oscillation is lower frequency than vibration and occurs throughout a longer period of time than a vibration. The greater the number of oscillations of the water 16 stored in the water storage container 14, the less the controller 54 needs to agitate the water 16 via the agitator assembly 46 in order to sanitize sufficiently the water 16 (i.e., the less the agitation period of time ($t_a$) can be).

In embodiments, the offset period of time ($t_o$) determined from the output of the sensor 52 is a function of the total vibrational energy applied to the water 16 stored in the water storage container 14 as the controller 54 determines from output of the sensor 52. The greater the total vibrational energy applied to the water 16 stored in the water storage container 14 since the last agitation of the water 16 in the water storage container 14, the greater the offset period of time ($t_o$) that is subtracted from the baseline period of time ($t_b$) to determine the agitation period of time ($t_a$) during which the controller 54 causes the agitator assembly 46 to agitate the water 16. In some instances, the total vibrational energy agitates the water 16 sufficiently so that the controller 54 determines that the agitation period of time ($t_a$) required is zero.

In embodiments, the offset period of time ($t_o$) determined from the output of the sensor 52 is a function of the number of oscillations of the water 16 stored in the water storage container 14 as the controller 54 determines from output from the sensor 52. The greater the number of oscillations of the water 16 stored in the water storage container 14 since the last agitation of the water 16 in the water storage container 14, the greater the offset period of time ($t_o$) that is subtracted from the baseline period of time ($t_b$) to determine the agitation period of time ($t_a$) during which the controller 54 causes the agitator assembly 46 to agitate the water 16. In some instances, the oscillations agitate the water 16 sufficiently so that the controller 54 determines that the agitation period of time ($t_a$) required is zero.

In embodiments, the offset period of time ($t_o$) determined from the output of the sensor 52 is a function of both (i) the total vibrational energy applied to the water 16 stored in the water storage container 14 as the controller 54 determines from output of the sensor 52 and (ii) the number of oscillations of the water 16 stored in the water storage container 14 as the controller 54 determines from output from the sensor 52. In other words, the agitation period of time ($t_a$) can be reduced by the agitation of the water 16 that the total vibrational energy and the number of oscillations imparted since the last agitation of the water 16 via the agitation assembly. While the total vibrational energy alone and the number of oscillations alone may not have sufficiently agitated the water 16, the controller 54 can determine that the combination of the total vibrational energy and the oscillations has sufficiently agitated the water 16 so that the controller 54 determines that the agitation period of time ($t_a$) is zero. That is, in embodiments, the controller 54 determines that the offset period of time ($t_o$) is greater than the baseline period of time ($t_b$), and the controller 54 determines that the agitation period of time ($t_a$) is zero.

In embodiments, the baseline period of time ($t_b$) is predetermined and invariable (e.g., always 10 minutes). In other embodiments, the controller 54 determines the baseline period of time ($t_b$) as a function of a temperature of the environment 18 external to the vehicle 10. As the temperature of the environment 18 increases, a temperature of the water 16 in the water storage container 14 increases as well, assuming there is no attempt to refrigerate the water 16 in the water storage container 14. As the temperature of the water 16 in the water storage container 14 increases, the baseline period of time ($t_b$) considered to agitate sufficiently the water 16 in the water storage container 14 increases as well. In short, the warmer the water 16 is, the greater the agitation time potentially required to maintain the sanitization of the water 16. The controller 54 can determine the temperature of the environment 18 via a sensor 72 in communication with the controller 54 or via communication with a remote server. In embodiments, the baseline period of time ($t_b$) is a function of global positioning system coordinates of the vehicle 10. In embodiments, the baseline period of time ($t_b$) is a function of the date, the time, the traffic, the calendar of the user 24, or some combination of those concepts previously mentioned.

Figure 6:
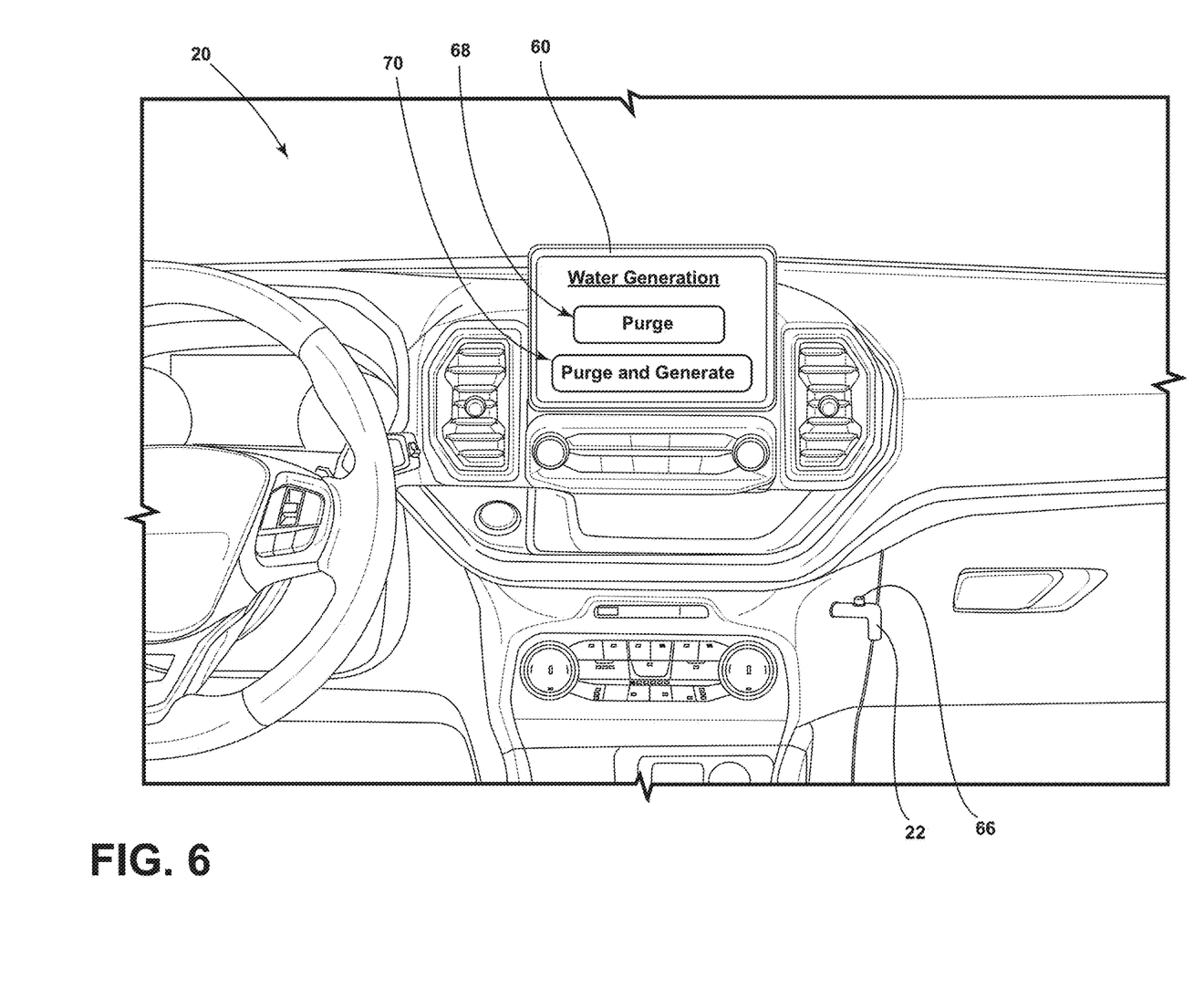
FIG. 6 is a perspective view of the interior of the vehicle of FIG. 1, illustrating the human-machine interface displaying (i) a selectable option to the user that, if selected, causes the controller to purge the water from the water storage container to the environment external to the vehicle and (ii) another selectable option that, if selected, causes the controller to execute such a purge and then causes the water generator to generate, anew, water to be stored in the water storage container.

Referring now to FIG. 6, in embodiments, the controller 54, via the human-machine interface 60, presents to the user 24 a selectable option 68 regarding whether to purge the water 16 from the water storage container 14 (e.g., "PURGE"). When the user 24 selects the selectable option 68, the controller 54 causes the purge of the water 16 from the water storage container 14, such as by causing the valve 42 to move to the open position. Similarly, in embodiments, the controller 54, via the human-machine interface 60, presents to the user 24 a selectable option 70 regarding whether to purge the water 16 from the water storage container 14 and then generate anew water 16 to be stored in the water storage container 14 (e.g., "PURGE and GENERATE"). When the user 24 selects the selectable option 70, the controller 54 causes the purge of the water 16 from the water storage container 14, such as by causing the valve 42 to move to the open position and then the closed position after the water 16 has been purged, and then by causing the water generator 12 to generate water 16 that is subsequently stored in the water storage container 14. In embodiments, the controller 54 determines that the purge of the water 16 from the water storage container 14 has been completed as a function of the output of the sensor 40. For example, the controller 54 can determine, based on the output of the sensor 40, that the water storage container 14 does not include any more water 16 to purge, such as when the output of the sensor 40 is not changing as a function of time (indicating a constant volume of water 16 of zero).

In embodiments, a propulsion system (not illustrated) of the vehicle 10 includes an electric motor and a battery that can be charged to power the electric motor. In embodiments, the controller 54 presents the selectable options 68, 70 only when the battery is being charged or in communication with a charging source.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   a water generator configured to generate water;
   a water storage container configured to store the water that the water generator generates;
   an ultraviolet light emitter configured to emit ultraviolet light into the water storage container;
   a sensor configured to detect either (i) a wavelength range or (ii) an intensity, at a predetermined wavelength or wavelength range, of the ultraviolet light that the ultraviolet light emitter has emitted; and
   a human-machine interface configured to issue a notification to a user of the vehicle regarding the ultraviolet light emitter.

2. The vehicle of claim 1 further comprising:
   a controller in communication with the ultraviolet light emitter, the sensor, and the human-machine interface;
   wherein, the controller determines, based on output from the sensor, either (i) that the wavelength range of the ultraviolet light that the ultraviolet light emitter has emitted was partially outside of a predetermined wavelength range or (ii) the intensity, at the predetermined wavelength or wavelength range, of the ultraviolet light that the ultraviolet light emitter has emitted is lower than a predetermined minimum intensity but is a positive value;
   wherein, the controller maintains activation of the ultraviolet light emitter for longer than a predetermined period of time; and
   wherein, the notification that the human-machine interface issues indicates that the ultraviolet light emitter is performing adequately to sanitize the water in the water storage container.

3. The vehicle of claim 1 further comprising:
   a controller in communication with the ultraviolet light emitter, the sensor, and the human-machine interface;
   wherein, the controller determines, based on output from the sensor, either (i) that the wavelength range of the ultraviolet light that the ultraviolet light emitter has emitted is entirely within a predetermined wavelength range or (ii) the intensity, at the predetermined wavelength or wavelength range, of the ultraviolet light that the ultraviolet light emitter has emitted is higher than a predetermined minimum intensity; and wherein, the notification that the human-machine interface issues indicates that the ultraviolet light emitter is performing adequately to sanitize the water in the water storage container.

4. The vehicle of claim 1 further comprising:
a controller in communication with the ultraviolet light emitter, the sensor, and the human-machine interface;
wherein, the controller determines, based on output from the sensor, either (i) that the wavelength range of the ultraviolet light that the ultraviolet light emitter has emitted is entirely outside of a predetermined wavelength range or (ii) the intensity, at the predetermined wavelength or wavelength range, of the ultraviolet light that the ultraviolet light emitter has emitted is lower than a predetermined minimum intensity; and
wherein, the notification that the human-machine interface issues indicates that the ultraviolet light emitter is performing inadequately to sanitize the water in the water storage container.

5. The vehicle of claim 1 further comprising:
a valve in communication with the water storage container, the valve comprising (i) an open position where water stored in the water storage container flows to an environment external to the vehicle and (ii) a closed position where water stored in the water storage container does not flow to the environment external to the vehicle; and
a controller in communication with the ultraviolet light emitter, the sensor, the valve, and the human-machine interface;
wherein, the controller determines, based on output from the sensor, either (i) that the wavelength range of the ultraviolet light that the ultraviolet light emitter has emitted is entirely outside of a predetermined wavelength range or (ii) the intensity, at the predetermined wavelength or wavelength range, of the ultraviolet light that the ultraviolet light emitter has emitted is lower than a predetermined minimum intensity; and
wherein, the controller causes the valve to move to the open position.

6. The vehicle of claim 1, wherein
the sensor is positioned so that the ultraviolet light transmits through water stored in the storage container before the sensor detects the ultraviolet light.

7. The vehicle of claim 1 further comprising:
a valve in communication with the water storage container, the valve comprising (i) an open position where water stored in the water storage container flows to an environment external to the vehicle and (ii) a closed position where water stored in the water storage container does not flow to the environment external to the vehicle; and
wherein, a controller in communication with the ultraviolet light emitter, the sensor, the valve, and the human-machine interface;
wherein, the controller causes the human-machine interface to present a selectable option regarding whether to purge the water from the water storage container; and
wherein, the controller is configured to cause the valve to move to the open position when the selectable option is selected.

8. The vehicle of claim 1, wherein
the sensor detects the wavelength range and the vehicle further comprises a second sensor that detects the intensity of the ultraviolet light at the predetermined wavelength or wavelength range that the ultraviolet light emitter has emitted.

9. A vehicle comprising:
a water generator configured to generate water;
a water storage container configured to store the water that the water generator generates;
an ultraviolet light emitter configured to emit ultraviolet light into the water storage container;
a sensor configured to detect the ultraviolet light that the ultraviolet light emitter has emitted;
a human-machine interface configured to issue a notification to a user of the vehicle regarding the ultraviolet light emitter; and
a controller in communication with the ultraviolet light emitter, the sensor, and the human-machine interface;
wherein, the sensor detects either (i) a wavelength range or (ii) an intensity, at a predetermined wavelength or wavelength range, of the ultraviolet light that the ultraviolet light emitter has emitted;
wherein, the controller determines, based on output from the sensor, either (i) that the wavelength range of the ultraviolet light that the ultraviolet light emitter has emitted is entirely outside of the predetermined wavelength range or (ii) the intensity, at the predetermined wavelength or wavelength range, of the ultraviolet light that the ultraviolet light emitter has emitted is lower than a predetermined minimum intensity; and
wherein, the notification that the human-machine interface issues indicates that the ultraviolet light emitter is performing inadequately to sanitize the water in the water storage container.

10. The vehicle of claim 9, wherein
the controller is configured to activate the ultraviolet light emitter for a predetermined period of time to sanitize the water stored in the water storage container.

11. The vehicle of claim 9 further comprising:
a first valve in fluid communication with the water storage container and a second valve in communication with an outlet, wherein the first valve and the second valve are operable between an open position and a closed position.

12. The vehicle of claim 11, wherein
the first valve purges the water to an external environment of the vehicle when in the open position, and
the second valve directs the water through the outlet from the water storage container.

13. A vehicle comprising:
a water generator configured to generate water;
a water storage container configured to store the water that the water generator generates;
an ultraviolet light emitter configured to emit ultraviolet light into the water storage container;
a sensor configured to detect the ultraviolet light that the ultraviolet light emitter has emitted;
a human-machine interface configured to issue a notification to a user of the vehicle regarding the ultraviolet light emitter;
a valve in communication with the water storage container, the valve comprising (i) an open position where water stored in the water storage container flows to an environment external to the vehicle and (ii) a closed position where water stored in the water storage container does not flow to the environment external to the vehicle; and a controller in communication with the ultraviolet light emitter, the sensor, the valve, and the human-machine interface;

wherein, the controller causes the human-machine interface to present a selectable option regarding whether to purge the water from the water storage container; and wherein, the controller is configured to cause the valve to move to the open position when the selectable option is selected.

14. The vehicle of claim 4 forther comprising:
a valve in fluid communication with the water storage container and an outlet,
wherein, the valve is configured to allow water to be discharged out of the outlet from the water storage container when the valve is in an open position.

15. The vehicle of claim 14, wherein
the controller via the human-machine interface provides a selectable option to dispense water out of the outlet when the notification indicates that the ultraviolet light emitter is performing inadequately to sanitize the water in the water storage container.

16. The vehicle of claim 14, wherein
the controller causes the valve to move to a closed position to prevent discharge of water from the outlet until the controller determines, based on output from the sensor, that the intensity, at the predetermined wavelength or wavelength range, of the ultraviolet light that the ultraviolet light emitter has emitted is no longer lower than the predetermined minimum intensity.

17. The vehicle of claim 13 further comprising:
a collector configured to collect the water that the water generator generates, before the water enters the water storage container, and
a second valve in communication with the controller and in a fluid flow path between the collector and the water storage generator.

18. The vehicle of claim 17, wherein
the controller prevents the water from entering the water storage container from the collector until an action is performed by manipulating the second valve to direct the water from the collector to the valve to purge the water from the vehicle.

19. The vehicle of claim 17, wherein
the controller manipulates the second valve to allow the water collected in the collector to flow into the water storage container.

* * * * *